(12) United States Patent
Färber et al.

(10) Patent No.: US 8,639,244 B2
(45) Date of Patent: Jan. 28, 2014

(54) WIRELESS COMMUNICATION AFTER SUBSCRIBER STATION IS SWITCHED ON

(75) Inventors: Michael Färber, Wolfratshausen (DE); Norbert Kroth, Potsdam (DE)

(73) Assignee: Siemens Aktiengesellschaft, Munich (DE)

(*) Notice: Subject to any disclaimer, the term of this patent is extended or adjusted under 35 U.S.C. 154(b) by 920 days.

(21) Appl. No.: 12/086,260

(22) PCT Filed: Nov. 24, 2006

(86) PCT No.: PCT/EP2006/068897
§ 371 (c)(1),
(2), (4) Date: Jun. 9, 2008

(87) PCT Pub. No.: WO2007/065805
PCT Pub. Date: Jun. 14, 2007

(65) Prior Publication Data
US 2009/0163205 A1    Jun. 25, 2009

(30) Foreign Application Priority Data
Dec. 9, 2005    (EP) .................................... 05026962

(51) Int. Cl.
*H04W 4/00*    (2009.01)
*H04W 36/00*    (2009.01)
*H04W 72/00*    (2009.01)

(52) U.S. Cl.
USPC ...................... 455/435.1; 455/436; 455/450

(58) Field of Classification Search
USPC ........ 455/435.1, 436, 450, 451, 452.1, 452.2, 455/453
See application file for complete search history.

(56) References Cited

U.S. PATENT DOCUMENTS

| | | | | |
|---|---|---|---|---|
| 6,088,591 A * | 7/2000 | Trompower et al. | ........... | 455/438 |
| 6,519,457 B1 | 2/2003 | Jiang et al. | | |
| 7,376,425 B2 * | 5/2008 | Laroia et al. | .................. | 455/437 |
| 7,590,421 B2 * | 9/2009 | Ryu et al. | ...................... | 455/436 |
| 2004/0120283 A1 * | 6/2004 | Rezaiifar et al. | .............. | 370/328 |

(Continued)

FOREIGN PATENT DOCUMENTS

| | | |
|---|---|---|
| CN | 1578527 A | 2/2005 |
| EP | 0 898 438 A2 | 2/1999 |
| WO | 01/52432 A1 | 7/2001 |

OTHER PUBLICATIONS

International Search Report for Application No. PCT/EP2006/068897; mailed Mar. 5, 2007.

*Primary Examiner* — Christopher M Brandt
(74) *Attorney, Agent, or Firm* — Staas & Halsey LLP

(57) ABSTRACT

In a wireless communication system having at least first and second radio stations located at a network end and connected to a core network, the first radio station receives a registration message from a user station to initially register the user station in a radio station located at the network end, after the user station has been switched on. Subsequently, communication takes place between the core network and the user station. Signaling messages that are to be sent from the core network to the user station are transmitted, at least at the beginning of the communication between the core network and the user station, from the core network to the second radio station, then from the second radio station to the first radio station or another radio station located at the network end, and from the first radio station (or the other radio station) directly to the user station.

13 Claims, 2 Drawing Sheets

(56) References Cited

U.S. PATENT DOCUMENTS

| | | | |
|---|---|---|---|
| 2004/0153525 A1* | 8/2004 | Borella | 709/217 |
| 2004/0203734 A1* | 10/2004 | Ishii | 455/426.1 |
| 2004/0213260 A1* | 10/2004 | Leung et al. | 370/395.3 |
| 2005/0054338 A1* | 3/2005 | Hosokawa | 455/422.1 |
| 2005/0058099 A1* | 3/2005 | Hernandez-Mondragon et al. | 370/331 |
| 2005/0070283 A1* | 3/2005 | Hashimoto et al. | 455/435.1 |
| 2005/0143065 A1* | 6/2005 | Pathan et al. | 455/432.1 |
| 2006/0105777 A1* | 5/2006 | Shinozaki | 455/456.1 |
| 2006/0153063 A1* | 7/2006 | Islam et al. | 370/216 |

* cited by examiner

WIRELESS COMMUNICATION AFTER SUBSCRIBER STATION IS SWITCHED ON

CROSS REFERENCE TO RELATED APPLICATIONS

This application is based on and hereby claims priority to European Application No. 05026962 filed on Dec. 9, 2005, the contents of which are hereby incorporated by reference.

BACKGROUND

Described below is a method for communication in a wireless communication system after a subscriber station is switched on.

In wireless communication systems, messages comprising, e.g., voice information, image information, video information, SMS (Short Message Service), MMS (Multimedia Messaging Service) or other data are transmitted by electromagnetic waves via a wireless interface between sending and receiving stations. Depending on the actual configuration of the wireless communication system, the stations here can be different types of subscriber stations or network-side wireless stations such as repeaters, wireless access points or base stations. In a mobile wireless communication system, at least some of the subscriber stations are mobile radio stations. The emission of the electromagnetic waves takes place using carrier frequencies in the frequency band which is provided for the system concerned.

Mobile wireless communication systems are frequently designed as cellular systems, e.g. in accordance with the GSM (Global System for Mobile Communications) or UMTS (Universal Mobile Telecommunications System) standard, with a network infrastructure of base stations, entities for monitoring and controlling the base stations and further network-side entities, for example. In addition to these wide-area (supralocal) cellular hierarchical wireless networks featuring, wireless local-area networks (WLANs, Wireless Local Area Networks) also exist having a radio coverage area which is normally much more limited in spatial terms. Examples of various standards for WLANs include HiperLAN, DECT, IEEE 802.11, Bluetooth and WTAM.

The access from subscriber stations to the shared transmission medium is governed by multiple access/multiplex methods (Multiple Access, MA) in the case of wireless communication systems. Using these multiple accesses, the transmission medium can be divided between the subscriber stations in the time range (Time Division Multiple Access, TDMA), in the frequency range (Frequency Division Multiple Access, FDMA), in the code range (Code Division Multiple Access, CDMA) or in the space range (Space Division Multiple Access, SDMA). Combinations of multiple access methods are also possible, e.g. a frequency range multiple access method can be combined with a code range multiple access method.

SUMMARY

Addressed below is the problem of setting forth an efficient method for communication in a wireless communication system, in which communication with a subscriber station takes place after the subscriber station is switched on. A wireless communication system for carrying out the method is also set forth.

In the method for communication in a wireless communication system which includes at least a first network-side radio station and a second network-side radio station, both of these being connected to a core network, the first network-side radio station receives a registration message from a subscriber station. The registration message is used for the first registration of the subscriber station with a network-side radio station after the subscriber station has been switched on. Following the receipt of the registration message, communication takes place between the core network and the subscriber station. At least at the beginning of this communication, signaling messages which must be sent from the core network to the subscriber station are transmitted from the core network to the second network-side radio station, from the second network-side radio station to the first network-side radio station or to another network-side radio station, and from the first or the other network-side radio station directly to the subscriber station.

The wireless communication system under examination has at least two different network-side radio stations, specifically the first and the second network-side radio station, and one core network. The network-side radio stations are characterized inter alia in that they can communicate in each case with subscriber stations via radio. However, the core network includes further entities which do not communicate directly with subscriber stations via radio.

A subscriber station is switched on and sends a registration message for the purpose of registration to the first network-side radio station. The subsequent communication of the subscriber station with the core network can take place directly after the registration procedure has been completed. However, it is also possible that the subscriber station will remain in the switched-on state after the registration for a certain time before the communication takes place with the core network. The communication with the core network can be e.g. a voice transmission, e.g. an outgoing call from the subscriber station or an incoming call for the subscriber station, or a data transmission from or to the subscriber station. The subscriber station can communicate, via the core network, with other subscriber stations of the same or another wireless communication system, or also with entities of another type of communication system such as e.g. the Internet.

The communication of the subscriber station with the core network can include the transmission of messages containing payload information and/or signaling messages in an uplink and/or downlink direction. Preferably both payload and signaling messages are transmitted as part of the communication between subscriber station and core network. Payload information in a downlink direction is information which is at least partially brought to the attention of the user of the subscriber station, e.g. by acoustic or optical signals. By contrast, signaling messages contain information which is used to ensure the successful transmission of payload information or the maintenance of the connection between the subscriber station and the core network, but is not brought to the attention of the user of the subscriber station. Signaling messages are therefore required by lower layers of the protocol stack than messages containing payload information.

Although signaling messages which must be sent from the core network to the subscriber station are transmitted directly from the first network-side radio station or another network-side radio station wirelessly to the subscriber station, they are first received and routed by the second network-side radio station. In this context, the transmission between the core network and the second network-side radio station, and between the second network-side radio station and the first or the other network-side radio station, preferably takes place directly, i.e. without routing the signaling messages through other entities. However, it is also possible that these transmissions are done by routing the signaling messages. At the beginning of the communication between the core network and the subscriber station, it is preferable for all signaling messages which must be sent from the core network to the subscriber station to be transmitted via the route which runs through the second network-side radio station. Alternatively, it is also possible that only some of these signaling messages are transmitted via the second network-side radio station. The transmission takes place via the second network-side radio station at least at the beginning of the communication, i.e. it is possible that routing via the second network-side radio station does not take place during the entire course of the communication between the core network and the subscriber station. "At the beginning of the communication" preferably means that the described transmission method is used until another network-side radio station, which routes messages in the same way as the second network-side radio station previously did, takes the place of the second network-side radio station.

The direct wireless transmission to the subscriber station takes place through the first network-side radio station or another network-side radio station, wherein the other network-side radio station is not the second network-side radio station. The network-side radio station from which the subscriber station directly receives the messages during the communication with the core network preferably depends on the location of the subscriber station. If the subscriber station moves away from the radio coverage area of the first network-side radio station into the radio coverage area of another network-side radio station after registering with the first network-side radio station, for example, the direct communication of the subscriber station can take place with this other network-side radio station.

According to an advantageous development, signaling messages are transmitted from the second network-side radio station to the first or another network-side radio station and from the first or the other network-side radio station directly to the subscriber station. Additionally or alternatively, signaling messages from the subscriber station are transmitted directly to the first or another network-side radio station and from the first or the other network-side radio station to the second network-side radio station. In this context, the second network-side radio station is the end node of these transmissions in each case. This development preferably relates to specific types of signaling messages. The fact that the second network-side radio station is the endpoint of the transmission means that the relevant signaling messages which are transmitted from the second network-side radio station to the subscriber station do not originate from the core network, and that the relevant signaling messages which are transmitted from the subscriber station to the second network-side radio station are not routed to the core network. Consequently, the core network is not involved in the communication with the subscriber station in relation to these signaling messages. This is advantageous in particular with reference to signaling messages that relate to handovers and signaling messages that relate to measurements which must be or have been carried out.

In an embodiment, after receiving the registration message the first network-side radio station sends the second network-side radio station information relating to the subscriber station, whereupon the second network-side radio station sends the core network information relating to the subscriber station. In this way, it is possible to ensure that a transmission of signaling messages in a downlink direction can take place via the route from the core network via the second network-side radio station to the subscriber station. In particular, the transfer of the information can be used to establish connections along the route. It is also advantageous if the second network-side radio station, after receiving the information relating to the subscriber station from the first network-side radio station, sends a positive acknowledgement message to the first network-side radio station.

According to a development, the second network-side radio station is selected from a plurality of network-side radio stations. The plurality can be preconfigured, for example, by network-side radio stations having specific attributes. This selection is preferably carried out by the first network-side radio station or by an entity which notifies the first network-side radio station of the selection. The selection preferably takes place using information relating to a current loading of the second network-side radio station and/or relating to the location of the second network-side radio station. The former can be used to allow e.g. load equalization among various network-side radio stations. The latter cited dependency can be used to take into consideration where the second network-side radio station is sited relative to the current or a future location of the subscriber station and/or relative to the location of the first network-side radio station.

The communication between the core network and the subscriber station can be a communication which is initiated by the subscriber station. In this case, the message which starts the communication or requests the start of the communication is sent by the subscriber station. Alternatively, it can be a communication which is initiated by the core network. In this case, the message which starts the communication or requests the start of the communication is sent by the core network to the subscriber station.

In a development, at least at the beginning of the communication, signaling messages which must be sent from the subscriber station to the core network are transmitted from the subscriber station directly to the first network-side radio station or to another network-side radio station, from the first network-side radio station or the other network-side radio station to the second network-side radio station, and from the second network-side radio station to the core network. This corresponds to the uplink direction of the method described above for the downlink direction, and therefore the above explanations apply correspondingly.

According to an advantageous development, at least at the beginning of this communication, messages containing payload information which must be sent from the core network to the subscriber station are transmitted from the core network, without routing through the second network-side radio station, to the first network-side radio station or to another network-side radio station, and from the first or the other network-side radio station directly to the subscriber station. In this case, at least for the downlink direction, different transmission paths are used between the core network and the subscriber station for the transmission of signaling on one hand and the transmission of payload information on the other hand. It is also advantageous if additionally or alternatively, at least at the beginning of the communication, messages containing payload information which must be sent from the subscriber station to the core network are transmitted from the subscriber station directly to the first network-side radio station or to another network-side radio station, and from the first network-side radio station or the other network-side radio station to the core network without routing through the second network-side radio station. In this case, at least for the uplink direction, different transmission paths are used between the core network and the subscriber station for the transmission of signaling on one hand and the transmission of payload information on the other hand.

According to a further embodiment, at least at the beginning of the communication, messages containing payload information which must be sent from the core network to the subscriber station are transmitted from the core network to the second network-side radio station, from the second network-side radio station to the first network-side radio station or to another network-side radio station, and from the first or the other network-side radio station directly to the subscriber station. In this case, at least for the downlink direction, the same transmission path is used between the core network and the subscriber station for the transmission of signaling on one hand and the transmission of payload information on the other hand. It is also advantageous if additionally or alternatively, at least at the beginning of the communication, messages containing payload information which must be sent from the subscriber station to the core network are transmitted from the subscriber station directly to the first network-side radio station or to another network-side radio station, from the first or the other network-side radio station to the second network-side radio station, and from the second network-side radio station to the core network. In this case, at least for the uplink direction, the same transmission path is used between the core network and the subscriber station for the transmission of signaling on one hand and the transmission of payload information on the other hand.

In a development, provision is made for changing the network-side radio station with which the subscriber station directly communicates, while the function of the second network-side radio station remains the same in relation to the routing of messages between the core network and the subscriber station. It is thus possible to allow for the fact that the subscriber station can move. It is often not possible or advantageous for the network-side radio station with which the subscriber station directly communicates to remain the same if the subscriber station moves. According to this embodiment, the path for transmitting signaling information and possibly also payload information can continue to run via the second network-side radio station despite the change of network-side radio station which communicates directly with the subscriber station.

It is advantageous if the function of the second network-side radio station in relation to the routing of messages between the core network and the subscriber station is assumed by a third network-side radio station. In this way, the path for transmitting signaling information and possibly also payload information can initially run via the second network-side radio station and subsequently via a third network-side radio station.

The wireless communication system described below features a first network-side radio station for receiving a registration message from the subscriber station for the first registration of the subscriber station with a network-side radio station after the subscriber station is switched on, and transmitting signaling messages which must be sent from the core network to the subscriber station, at least at the beginning of a communication between the subscriber station and the core network, from the core network to the second network-side radio station, from the second network-side radio station to the first or another network-side radio station, and from the first or the other network-side radio station directly to the subscriber station.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
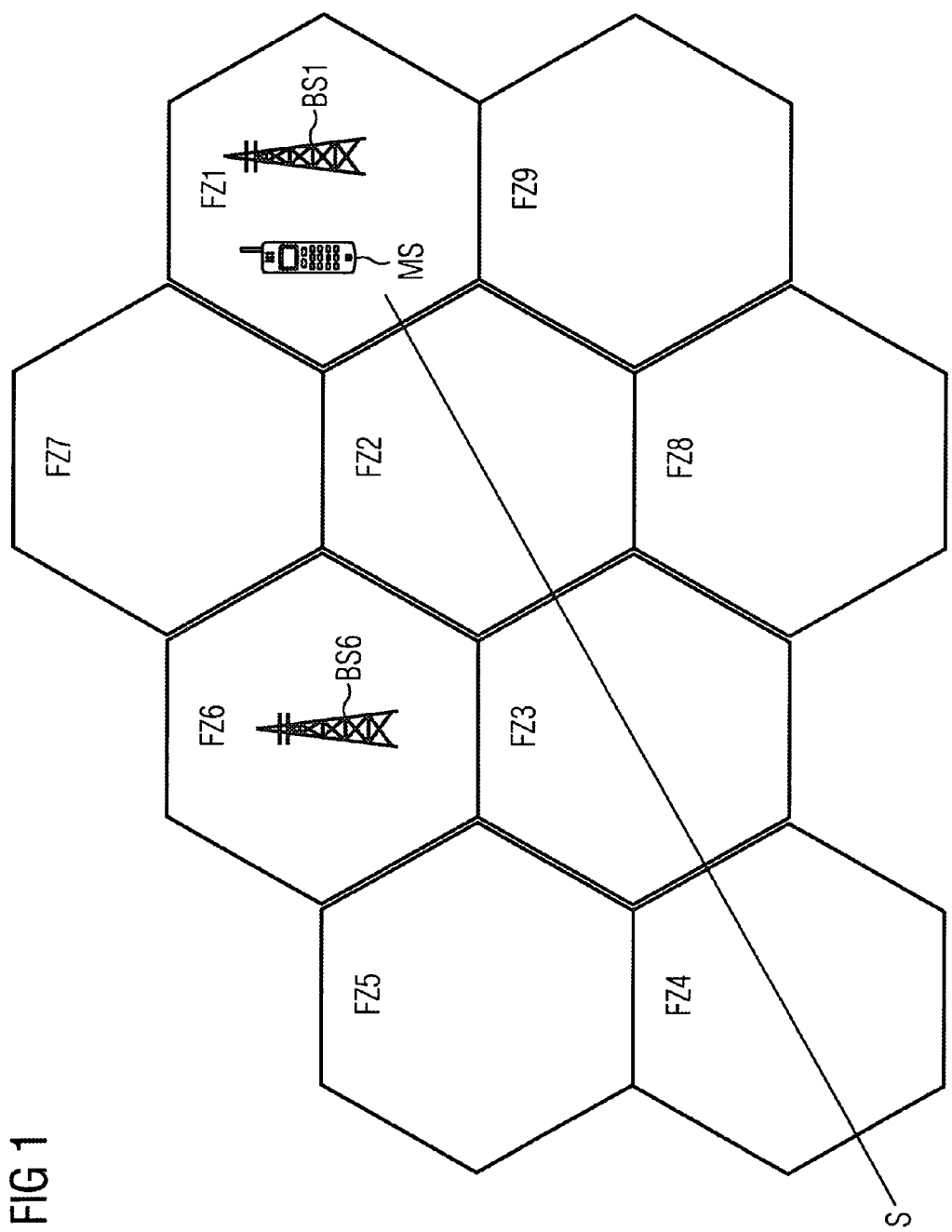
FIG. 1 is a section of a wireless communication system.

Reference will now be made in detail to the preferred embodiments, examples of which are illustrated in the accompanying drawings, wherein like reference numerals refer to like elements throughout.

FIG. 1 shows a section of a cellular wireless communication system which has the radio cells FZ1, FZ2, FZ3, FZ4, FZ5, FZ6, FZ7, FZ8 and FZ9. In the radio cells FZ1 to FZ9, a base station communicates in each case with the subscriber stations that are located in the radio cell concerned. The base station BS1 of the radio cell FZ1 and the base station BS6 of the radio cell FZ6 are illustrated by way of example. The base stations of the radio cells FZ1 to FZ9 are connected together by a suitable communication connection, e.g. via wireless or line, such that each base station can communicate with each other base station either directly or via other base stations. Each base station of the radio cells FZ1 to FZ9 is additionally attached to a core network CN (not shown).

Figure 2:
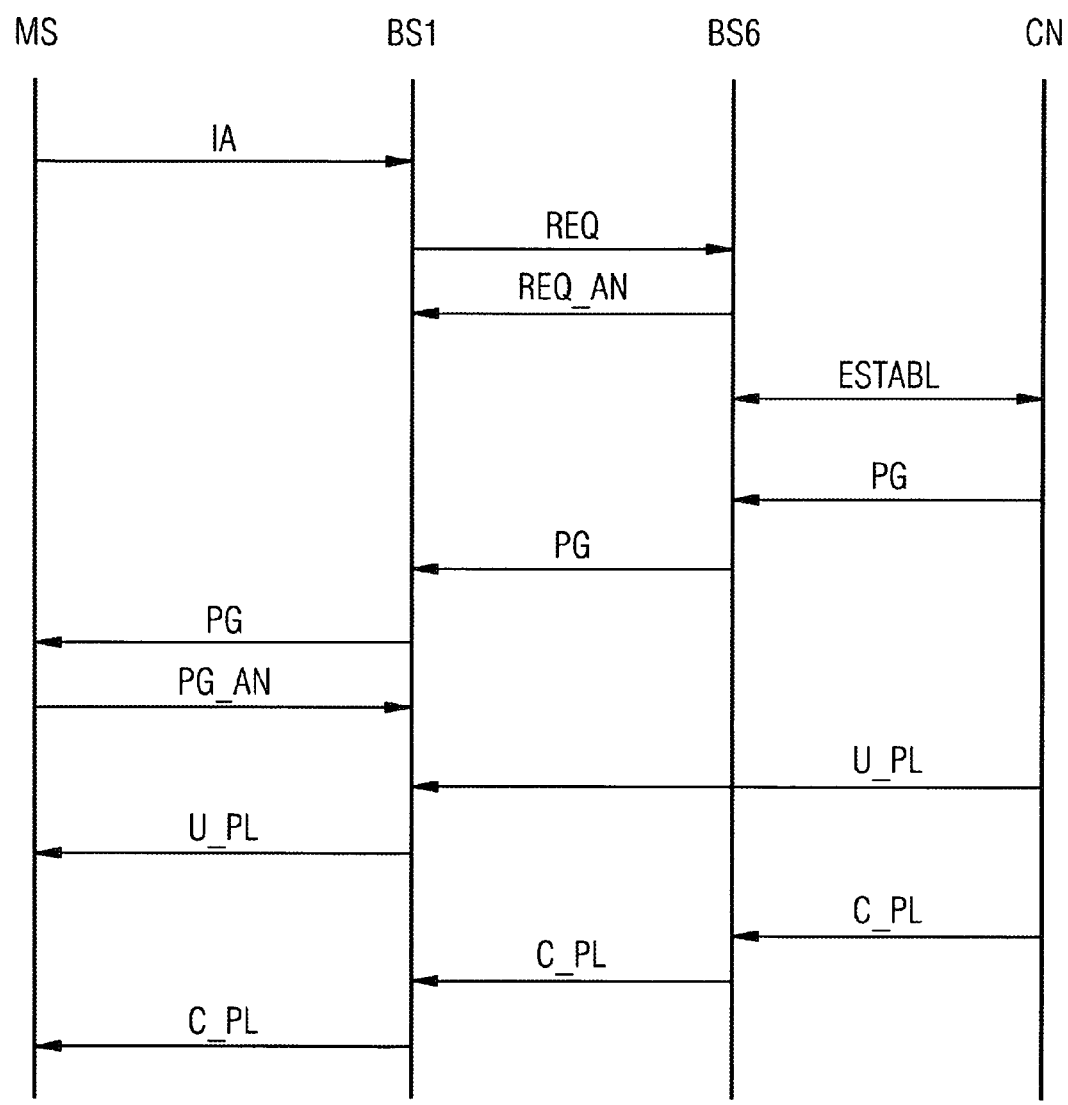
FIG. 2 is an exemplary flow diagram of the method described below.

The subscriber station MS is located in the radio cell FZ1 of the base station BS1. By way of example, the case is examined in which an airport is situated within the radio cell FZ1 and the subscriber station MS in the airport is turned on. As a result of this status change from the switched-off state to the switched-on state, the subscriber station MS must register with the mobile wireless communication system. FIG. 2 shows a flow diagram of the method which takes place between the subscriber station MS and the base station BS1, between the base station BS1 and the base station BS6, and between the base station BS6 and the core network CN.

As part of the initial registration, in block IA (IA: initial access), the subscriber station MS first contacts the base station BS1 in whose radio cell FZ1 it is located. The selection of the radio cell FZ1, or of the base station BS1 which is assigned to the radio cell FZ1, by the subscriber station MS can take place using suitable criteria such as the reception strength experienced by the subscriber station MS of signals from the base station BS1, wherein the reception strength represents a measure for the wireless conditions between the base station BS1 and the subscriber station MS. The block IA can be a procedure which is known per se for establishing contact between a subscriber station and a network-side radio station if the subscriber station was not previously registered with the mobile wireless communication system and a registration now takes place due to a status change from the switched-off state to the switched-on state.

In the following operation, REQ, the base station BS1 sends a request to the base station BS6. This request is intended to establish whether the base station BS6 is able to perform an anchor function for the subscriber station MS, wherein the anchor function is explained in greater detail below. In the block REQ_AN, the base station BS6 then sends a positive answer in relation to the request.

In the block ESTABL, it is then agreed between the core network CN and the base station BS6 that signaling messages which must be sent from the core network CN to the subscriber station MS and signaling messages which must be sent from the subscriber station MS to the core network CN are routed via the base station BS6. These signaling messages are designated as C-Plane or Control Plane messages in the case of UMTS.

Although the subscriber station MS is switched on and is registered with the mobile wireless communication system, no exchange of messages takes place between the subscriber station MS and the base station BS1 in this state, which is often designated as "idle". The subscriber station MS only has to register via the new base station if it leaves a specific area of radio cells (the so-called paging area).

In the following, it is assumed that messages must be transmitted from the network to the subscriber station MS. This situation occurs e.g. if an incoming call for the subscriber station MS is present. A paging message PG is sent from the core network CN to the anchor base station BS6, which routes the paging message PG to the base station BS1 and preferably to a plurality of other base stations that emit the paging message PG. This means that the paging message PG is sent from the base station BS1 to the subscriber station MS. The paging message PG is a signaling message and is therefore sent from the core network to the base station BS6, which performs the anchor function for the subscriber station MS and routes the paging message PG.

The subscriber station MS answers the paging message PG using a message PG_AN, which it sends to the base station BS1. As a result of the exchange of messages PG and PG_AN or as a result of an exchange of further messages between the subscriber station MS and the base station BS1, the radio channel (designated as "radio bearer" in the case of UMTS) which is subsequently used for message transmission between the subscriber station MS and the base station BS1 is established. In addition, a signaling connection between the base station BS1 and the anchor base station BS6 and a signaling connection between the anchor base station BS6 and the core network CN are established (not shown in FIG. 2). A direct connection between the base station BS1 and the core network CN is preferably set up for the transmission of payload data, such that messages containing payload data do not necessarily have to be transmitted via the anchor base station BS6.

As an alternative to the case illustrated in FIG. 2, according to which the paging message PG is sent to the subscriber station MS from the core network CN, it is also possible for the subscriber station MS to initiate the communication with the base station BS1 by sending the base station BS1 a message by which the allocation of wireless resources is requested. This situation occurs e.g. if an outgoing call from the subscriber station MS is present. Again in this case of the communication being initiated by the subscriber station MS, a radio channel is established between the subscriber station MS and the base station BS1, as well as the further connections described above.

Information about the successful creation of a connection between the subscriber station MS and the base station BS1 can be sent (not shown in FIG. 2) from the base station BS1 to the core network CN directly or via the base station BS6. Following the successful paging of the subscriber station MS, a message U_PL containing payload data is transmitted from the core network CN to the base station BS1, whence it is sent to the subscriber station MS. Messages containing payload data, these being designated as User Plane or U-Plane messages in the case of UMTS, are not therefore transmitted via the base station BS6 which performs the anchor function for the subscriber station MS. This applies to both the downlink direction, i.e. to transmissions from the core network CN to the subscriber station MS, and the uplink direction, i.e. to transmissions from the subscriber station MS to the core network CN.

In the context of the communication to the subscriber station MS, signaling messages C_PL which must be transmitted to the subscriber station MS are transmitted from the core network CN via the base station BS6 to the base station BS1, whence they are sent to the subscriber station MS. This applies to both the downlink direction, i.e. to transmissions from the core network CN to the subscriber station MS, and the uplink direction, i.e. to transmissions from the subscriber station MS to the core network CN.

The following applies in relation to the signaling messages: while the subscriber station MS communicates with the core network CN via the base station BS1 and the anchor base station BS6, the anchor base station BS6 is the endpoint or point of contact for the communication from the perspective of the core network CN and the subscriber station MS. If the subscriber station MS moves during the course of the communication, e.g. along the street S in FIG. 1, the base station with which it communicates changes from the base station BS1 to the base station of the radio cell FZ2, then to the base station of the radio call FZ3, etc. The role of the base station BS6 as a point of contact for the core network CN in relation to signaling messages can be maintained in this type of configuration. The micromobility of the subscriber station MS, i.e. the cell change of the subscriber station MS while maintaining the anchor function of the base station BS6, is not visible to the core network CN with regard to signaling messages; in terms of signaling messages, the anchor base station is still the endpoint of the micromobility procedures. As a result of this, the signaling load within the radio network and between the radio network and the core network CN is reduced. This is advantageous with regard to the processing load in the radio network and in the core network; moreover in the opposite case, i.e. if the core network was involved in the signaling messages that had to be exchanged every time a subscriber station changed cell, an additional time delay of the handover would be unavoidable due to the large spatial distance between the core network and the subscriber station.

According to FIG. 2, the messages U_PL containing payload information are sent to the subscriber station MS without the "detour" via the anchor base station BS6. This has the advantage that the time required for the transmission of payload information is reduced and therefore realtime services can be implemented more effectively. In contrast with the illustration in FIG. 2, however, it is also possible for the messages U_PL containing payload information to be routed by the anchor base station BS6 in the same way as the signaling messages C_PL. This results in the payload information and signaling information being transmitted in the same way from and to the subscriber station MS, such that the above explanations in relation to the signaling messages C_PL also apply to the payload messages U_PL.

If the subscriber station MS moves too far away from the radio cell FZ6 of the base station BS6, the anchor function of the base station BS6 can be assumed by another base station. For a large distance between the base station with which the subscriber station MS is currently communicating and the base station which performs the anchor function means a long time delay as a result of the need to transmit the messages between the two base stations. In contrast with the micromobility, the core network is involved in the macromobility of the subscriber station MS, i.e. in the case of cell changes which result in a change of the base station performing the anchor function. Corresponding to ESTABL, a new connection is established between the core network CN and the new anchor base station.

In accordance with the above explanations, the selection of a base station for communication with the subscriber station MS, i.e. the initial selection of the base station BS1, is separate from the selection of a base station which performs the anchor function in relation to the core network CN, i.e. the selection of the base station BS6. In this context, the anchor base station has both the role of routing signaling data or payload and signaling messages between the subscriber station MS and the core network CN, and the function of realizing the micromobility. If a base station that was selected at the start of communication with a subscriber station were to assume the role of the anchor base station automatically, this could result in a processing load accumulation due to the anchor function in the case of individual base stations. In the example of FIG. 1, all subscriber stations of airplane passengers which are switched on after landing in the airport in the radio cell FZ1 dial in to the base station BS1. If the base station BS1 had to assume the anchor function for all these subscriber stations, this could result in an overload of the base station BS1.

It is possible for all base stations to be capable in principle of functioning as an anchor base station. Alternatively, it is possible to have some base stations which can communicate with subscriber stations and perform the function of an anchor base station, while other base stations can only communicate with subscriber stations.

The selection of the base station BS6 as an anchor base station for the communication of the subscriber station MS can take place in accordance with various criteria. For example, one or more base stations which can function as anchor base stations can be defined for a group of base stations. These can be selected according to geographical criteria, for example. Base stations which are situated in regions having low volumes of radio traffic are advantageously configured as possible anchor base stations. In this way, any free capacity of base stations resulting from the low volume of radio traffic in the local radio cell can be utilized for routing messages from and to other base stations. A base station which requires an anchor base station contacts one of these specified base stations. If a plurality are available or selectable for this purpose, the base stations which are suitable as anchor base stations can notify the other base stations of their currently available attributes and capacity (so-called BS capabilities) for performing the anchor function, such that a load equalization can be achieved by a suitable selection of the anchor base station. Alternatively, the base station which is to be used as anchor base station, defined by its BS capabilities, can be specified by the operating and maintenance system of the wireless communication system, such that the base stations do not have any freedom of choice with regard to the anchor base station of subscriber stations that register with them after being switched on.

When selecting an anchor base station or specifying which base stations can function as anchor base stations in principle, it is possible to apply information about paths that are used by mobile stations. If the street S leads from the radio cell FZ1 through the radio cells FZ2, FZ3 and FZ4 as per FIG. 1, it is advantageous to use an anchor base station whose radio cells are located in the vicinity of the street. In this way, a base station can perform the role of the anchor base station over a longer period of time, without this role having to be transferred to other base stations too often. If there is a crossing between two streets, the anchor base station can be situated in the vicinity of the crossing, such that it can continue to perform its function as anchor base station, irrespective of which street a subscriber chooses, without causing excessive delays when routing messages.

If the base station of the radio cell FZ3 is selected as anchor base station, for example, it is possible that this base station functions for a period of time both as anchor base station and as base station communicating with the subscriber station MS when the subscriber station MS moves along the street S. While the mobility of the subscriber station can bring about the scenario in which the base station communicating with the subscriber station and the base station performing the anchor function are the same, therefore, this is not the case at the beginning of the communication. The base station that is contacted by a subscriber station which registers after it is switched on does not perform the role of the anchor base station, but asks another base station to perform this function. The radio cell or base station via which a subscriber station registers after being switched on is determined by a selection of the subscriber station on the basis of radio propagation conditions or on the basis of the position of the subscriber station. However, the anchor base station is not determined on the basis of radio criteria, but can instead by determined in accordance with more suitable criteria as described.

The approach described above is suitable in particular for wireless communication systems having flat hierarchies which do not include e.g. entities such as the BSC (Base Station Controller) or the RNC (Radio Network Controller) for monitoring and controlling base stations. This results in a simplification of the radio network. In this case, the functions of these entities must be assumed by other entities of the wireless communication system. Accordingly, some of these functions can be transferred to base stations while others can be performed by entities of the core network. It is advantageous if specific functions do not necessarily have to be provided by each base station in this context. A base station which is classified as a possible anchor base station can provide specific functionality and computing capacity for control tasks in the radio network, e.g. configuration and analysis of measurements of subscriber stations and/or base stations, handover decisions, paging coordination, interference monitoring and load sharing.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for communication in a wireless communication system having at least a first network-side radio station and a second network-side radio station which are connected to a core network, comprising:
    receiving at the first network-side radio station a registration message from a subscriber station for initial registration of the subscriber station with a network-side radio station after the subscriber station has been switched on; and communicating between the core network and the subscriber station, at least at a beginning of said communicating between the core network and the subscriber station, signaling messages which must be sent from the core network to the subscriber station being transmitted from the core network to the second network-side radio station, from the second network-side radio station to the first network-side radio station or to another network-side radio station, and from the first or the other network-side radio station directly to the subscriber station, and messages containing payload information which must be sent from the core network to the subscriber station are transmitted from the core network, without routing through the second network-side radio station, to the first network-side radio station or to the other network-side radio station, and from the first or the other network-side radio station directly to the subscriber station.

2. The method as claimed in claim 1, wherein signaling messages are transmitted from the second network-side radio station to the first network-side radio station or the other network-side radio station and from the first network-side radio station or the other network-side radio station directly to the subscriber station, and/or from the subscriber station directly to the first network-side radio station or the other network-side radio station and from the first network-side radio station or the other network-side radio station to the second network-side radio station, the second network-side radio station being an end node of the signaling messages.

3. The method as claimed in claim 2, further comprising:
after receiving the registration message, sending from the first network-side radio station to the second network-side radio station information relating to the subscriber station; and
sending from the second network-side radio station to the core network information relating to the subscriber station.

4. The method as claimed in claim 3, further comprising selecting the second network-side radio station from a plurality of radio stations.

5. The method as claimed in claim 4, wherein said selecting uses information relating to at least one of a current loading of the second network-side radio station and a location of the second network-side radio station.

6. The method as claimed in claim 5, wherein said communicating between the core network and the subscriber station includes at least one of communication initiated by the subscriber station and communication initiated by the core network.

7. The method as claimed in claim 6, wherein at least at the beginning, said communicating between the core network and the subscriber station includes transmitting signaling messages, which must be sent from the subscriber station to the core network, from the subscriber station directly to the first network-side radio station or to the other network-side radio station, from the first network-side radio station or the other network-side radio station to the second network-side radio station, and from the second network-side radio station to the core network.

8. The method as claimed in claim 1, wherein at least at the beginning of said communicating between the core network and the subscriber station, messages containing payload information which must be sent from the subscriber station to the core network are transmitted from the subscriber station directly to the first network-side radio station or to the other network-side radio station, and from the first network-side radio station or the other network-side radio station to the core network without routing through the second network-side radio station.

9. The method as claimed in claim 7, wherein at least at the beginning of said communicating between the core network and the subscriber station, messages containing payload information which must be sent from the core network to the subscriber station are transmitted from the core network to the second network-side radio station, from the second network-side radio station to the first network-side radio station or to the other network-side radio station, and from the first or the other network-side radio station directly to the subscriber station.

10. The method as claimed in claim 9, wherein at least at the beginning of said communicating between the core network and the subscriber station, messages containing payload information which must be sent from the subscriber station to the core network are transmitted from the subscriber station directly to the first network-side radio station or to the other network-side radio station, from the first network-side radio station or the other network-side radio station to the second network-side radio station, and from the second network-side radio station to the core network.

11. The method as claimed in claim 10, further comprising changing the first or the other network-side radio station with which the subscriber station directly communicates to a third network-side radio station, while the function of the second network-side radio station remains unchanged in relation to routing of the messages between the core network and the subscriber station.

12. The method as claimed in claim 11, further comprising assuming the function of the second network-side radio station in relation to the routing of messages between the core network and the subscriber station by a fourth network-side radio station.

13. A wireless communication system connected to a core network, comprising:
at least one subscriber station;
first, second and third network-side radio stations connected to the core network, the first network-side radio station receiving a registration message from the subscriber station for an initial registration of the subscriber station with any network-side radio station after the subscriber station is switched on; and
means for transmitting signaling messages, which must be sent from the core network to the subscriber station, at least at a beginning of communication between the subscriber station and the core network, from the core network to the second network-side radio station, from the second network-side radio station to the first or third network-side radio station, and from the first or third network-side radio station directly to the subscriber station, and at least at the beginning of said communicating between the core network and the subscriber station, messages containing payload information which must be sent from the core network to the subscriber station are transmitted from the core network, without routing through the second network-side radio station, to the first network-side radio station or to the other network-side radio station, and from the first or the other network-side radio station directly to the subscriber station.

* * * * *